United States Patent
Jeon (10) Patent No.: US 9,170,644 B2
(45) Date of Patent: Oct. 27, 2015

(54) METHOD AND SYSTEM FOR CONTROLLING MOBILE DEVICE BY TRACKING THE FINGER

(75) Inventor: Hyun Pil Jeon, Yongin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 470 days.

(21) Appl. No.: 13/345,557

(22) Filed: Jan. 6, 2012

(65) Prior Publication Data

US 2012/0176314 A1  Jul. 12, 2012

(30) Foreign Application Priority Data

Jan. 10, 2011  (KR) .................... 10-2011-0002309

(51) Int. Cl.
*G06F 3/01* (2006.01)
*G06F 3/041* (2006.01)

(52) U.S. Cl.
CPC .............. *G06F 3/011* (2013.01); *G06F 3/017* (2013.01); *G06F 3/041* (2013.01)

(58) Field of Classification Search
CPC .......... G06F 3/017; G06F 3/011; G06F 3/013
See application file for complete search history.

(56) References Cited

U.S. PATENT DOCUMENTS

| 2010/0079413 A1* | 4/2010 | Kawashima et al. ......... 345/175 |
| 2012/0212484 A1* | 8/2012 | Haddick et al. ............... 345/419 |
| 2012/0218172 A1* | 8/2012 | Border et al. .................... 345/8 |

FOREIGN PATENT DOCUMENTS

| KR | 10-2007-0034201 | 3/2007 |
| KR | 10-2009-0005807 | 1/2009 |
| KR | 10-2010-0027548 | 3/2010 |

* cited by examiner

*Primary Examiner* — Michael Faragalla (57) ABSTRACT

A method and system controls a mobile device by tracking the movement of a finger. A finger mode in which the mobile device is controlled by tracking a movement of a finger is activated. The finger is detected and the movement of the detected finger is tracked via a camera. And when the tracked movement of the detected finger corresponds to a preset motion, a function corresponding to the preset motion pattern is performed. A number of application programs can be controlled respectively by tracking the movement of fingers, via one of a number of input means.

18 Claims, 4 Drawing Sheets

METHOD AND SYSTEM FOR CONTROLLING MOBILE DEVICE BY TRACKING THE FINGER

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 10, 2011 and assigned Serial No. 10-2011-0002309, the contents of which are incorporated herein by reference.

TECHNICAL FIELD OF THE INVENTION

This invention relates to electronic communication devices, and more particularly, to a method and system for controlling a mobile device by tracking the movement of a finger.

BACKGROUND OF THE INVENTION

Mobile devices such as mobile communication terminals are equipped with a variety of functions and accordingly provide combined operations. Examples of the functions are a voice call, text message transmission/reception, digital broadcast reception, audio file playback, and such. In order to control and execute the functions, the mobile devices are equipped with input devices. The input devices may be implemented with various types of devices, such as button keypads, touch screens, touch pads, ball joysticks, optical joysticks, wheel keys, trackballs, and such. Most mobile devices tend to employ full touch screens as input devices that provide user convenience.

Conventional touch screens only allow for the user's direct touches to perform corresponding functions. This user's touch motion blocks a portion of the touch screen, so the user cannot touch a correct point, which causes the mobile device to malfunction. Therefore, new input devices need to be developed.

Mobile devices can perform multi-tasking by simultaneously executing a number of applications. Although mobile devices execute many applications, they cannot display the executed applications on one screen. This is because the screen size is limited. Therefore, in order to execute applications, a mobile device must switch between corresponding screens. For example, when an alarm event occurs in the mobile device while the device is reproducing a broadcast, it requires the user to switch the broadcast screen to the alarm screen and then touch the screen to release the alarm. Since conventional mobile devices control a number of executed applications via only one input device (e.g., a touch screen), it makes the user feel inconvenienced.

SUMMARY OF THE INVENTION

To address the above-discussed deficiencies of the prior art, it is a primary object to provide a method and system that can control a mobile device by tracking the movement of the finger.

The invention further provides a method and system that can control a number of application programs, respectively, by tracking the movement of fingers via one of a number of input means.

In accordance with an embodiment of the invention, a method for controlling a mobile device is provided. A finger mode in which the mobile device is controlled by tracing a movement of a finger is activated. The finger is detected and the movement of the detected finger is tracked via a camera. And when the tracked movement of the detected finger corresponds to a mapped motion pattern, a function corresponding to the mapped motion pattern is performed.

In accordance with another embodiment of the invention, a system for controlling a mobile device is provided. The system includes a camera and a controller. The camera acquires videos in a finger mode in which the mobile device is controlled by tracking a movement of a finger. The controller detects the finger via the videos acquired by the camera, tracks the movement of the detected finger, and performs, when the tracked movement of the detected finger corresponds to a mapped motion pattern, a function corresponding to the mapped motion pattern.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged motion sensing device. Hereinafter, embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

The following preferred embodiments of the invention are disclosed for illustrative purposes, so it should be understood that the scope of the invention should not be limited to the embodiments. It will be easily appreciated to those skilled in the art that various modifications, additions and substitutions are possible from the embodiments without departing from the scope of the invention.

Figure 1:
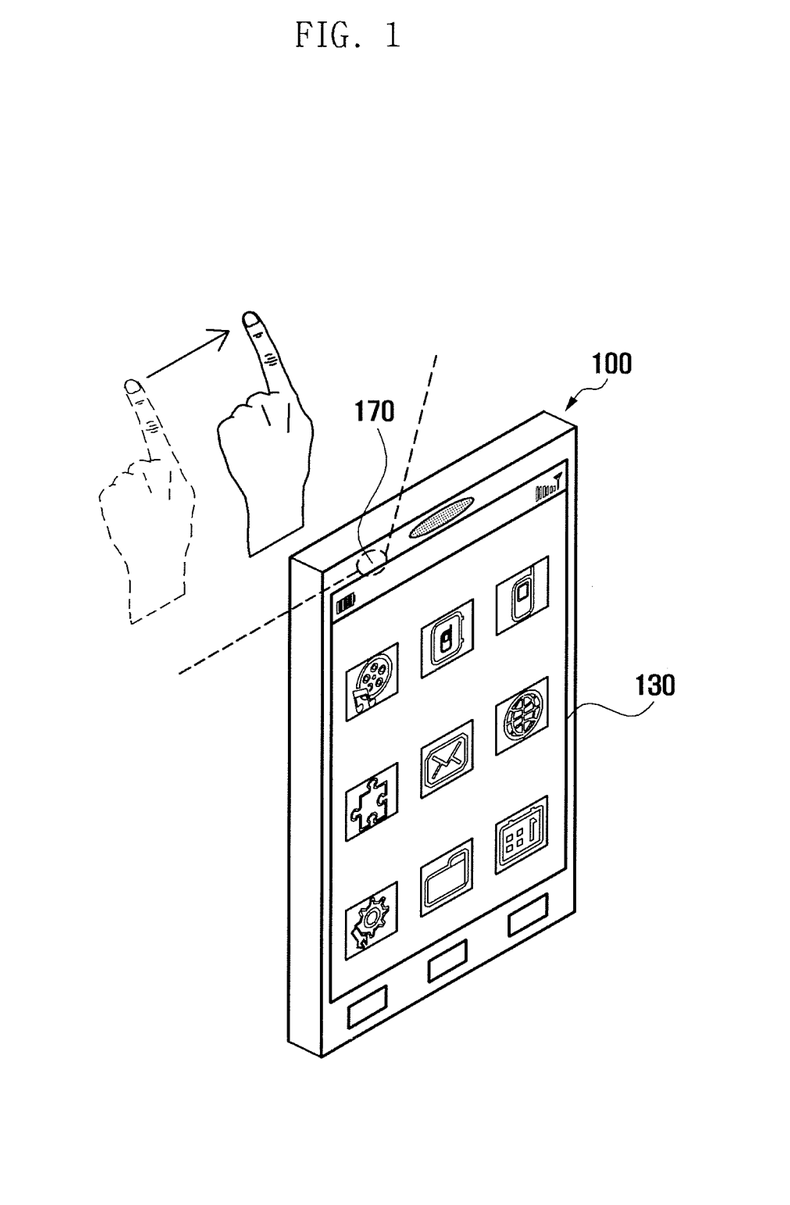
FIG. 1 illustrates a perspective view of a mobile device that is being controlled by tracking the movement of the user's finger, according to an embodiment of the invention.

FIG. 1 illustrates a perspective view of a mobile device that is being controlled by tracking the movement of the user's finger, according to an embodiment of the invention.

Referring to FIG. 1, the invention senses the user's finger via a camera 170 and controls the mobile device 100 by tracking the movement of the sensed finger. The invention provides an input system that allows the user to control the mobile device 100 without touching the touch screen 130. This makes the user control the mobile device 100 without covering the screen. This operation is hereinafter called a finger mode where the mobile device 100 is controlled by tracking the movement of the user's finger, and this mode can be turned on/off according to a user's selection.

When the mobile device 100 operates in a finger mode, it drives the camera 170 to sense the movement of the user's finger. When the mobile device 100 senses the user's finger movement via the camera 170, it detects the finger tip via the video acquired by the camera 170, and tracks it. When the movement of the finger corresponds to a particular motion pattern stored in the mobile device 100, the mobile device 100 performs the corresponding function. For example, when the mobile device 100 detects the user's finger moving from the left to the right while it is showing a menu screen is displayed, it can move the menu items thereon. Likewise, when the mobile device 100 detects the user's finger moving from the left to the right while executing an application, it can terminate the executed application. To this end, the mobile device 100 includes a database where patterns of the finger's gestures are mapped to functions. The database may be installed in mobile devices when they are manufactured. The mobile device users can alter the database to register, to delete, to edit mappings, and such.

Figure 2:
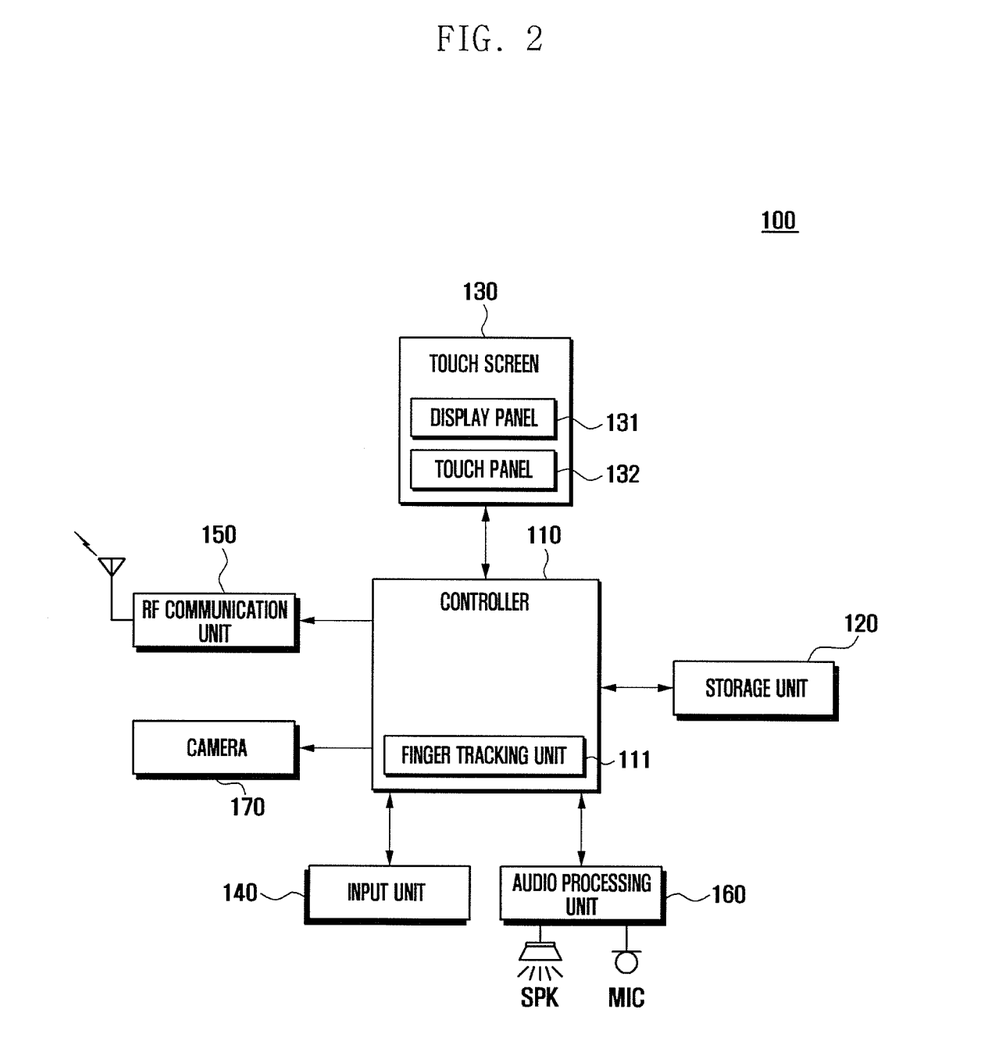
FIG. 2 illustrates a schematic block diagram of a mobile device according to an embodiment of the invention.

FIG. 2 illustrates a schematic block diagram of a mobile device according to an embodiment of the invention.

Referring to FIG. 2, the mobile device 100 includes a camera 170, an audio processing unit 160, an RF communication unit 150, an input unit 140, a touch screen 130, a storage unit 120 and a controller 110. The touch screen 130 includes a display panel 131 and a touch panel 132. The controller 110 includes a finger tracking unit 111.

The RF communication unit 150 performs a communication function. The RF communication unit 150 establishes a communication channel with a wireless network (including a base station) and performs a voice or video call, data communication, and such. The RF communication unit 150 includes an RF transmitter (not shown) for up-converting the frequency of signals to be transmitted and amplifying the signals and an RF receiver (not shown) for low-noise amplifying received RF signals and down-converting the frequency of the received RF signals. When the mobile device 100 is implemented in such a way that it does not provide a communication function, it may not include the RF communication unit 150.

The input unit 140 may include input keys and function keys that receive numerical or alphabetical information and set and control a variety of functions in the mobile device 100. Examples of input keys in the input unit 140 are a call key for requesting a voice call, a video call key for requesting a video call, a termination key for requesting the termination of a voice/video call, a volume key, and direction keys for controlling the output volume of audio signals. The input unit 140 may be implemented with one of a touch pad, touch screen, key pad, joystick, wheel key, and such, or a combination thereof.

The audio processing unit 160 processes audio signals, such as encoding, decoding, transmitting and receiving. The audio processing unit 160 includes CODECS, an amplifier, and such. The audio processing unit 160 is connected to a microphone (MIC) and a speaker (SPK). The audio processing unit 160 converts analog audio signals received via the microphone (MIC) into digital audio signals, and then transfers them to the controller. The audio processing unit 160 also converts digital audio signals output from the controller 110 into analog audio signals, and outputs them via the speaker (SPK). The audio processing unit 160 may also output audio signals to the speaker, created when MP3 files or video files, for example, are reproduced. In particular, the audio processing unit 160 may output a sound effect to indicate when a pattern does not exist that corresponds to the movement of the tracked finger when the mobile device is in the finger mode.

The camera 170 takes photographs of subjects. The camera 170 includes an image sensor and an image processor. An image sensor converts an optical image of a subject into an electronic video signal. In an embodiment of the invention, the image sensor is implemented with a Complementary Metal Oxide Semiconductor (CMOS) image sensor or a Charge Coupled Device (CCD) image sensor. The image processor processes a video output from the image sensor and then outputs the processed video. According to an embodiment, the image processor processes a video by, for example, resizing, moving it between memory devices, transforming it to RGB signals, converting it between analog/digital signal, removing noise, digital-zooming, rotation, encoding, and such. Since the camera 170 is well-known to the ordinary person skilled in the art, its detailed description will be omitted in this application. In an embodiment of the invention, the camera 170 is activated when the mobile device 100 operates in a finger mode, takes a video of a subject (e.g., the user's finger) and transfers it to the controller 110.

The touch screen 130 serves as both a display device and an input device. To this end, the touch screen 130 includes a display panel 131 and a touch panel 132. The display panel 131 performs a display function. For example, the display panel 131 displays screen data created when the mobile device 100 operates, events according to the user's inputs, state information according to key operations, information regarding functions set in the mobile device 100, and such. The display panel 131 also displays color information and signals output from the controller 110. In particular, when the controller 110 ascertains that the movement of the tracked user's finger does not correspond to a preset motion pattern, the display panel 131 may display an error message. In addition, when the controller 110 ascertains that an error occurs over a preset number of times, the display panel 131 may display information regarding stored motion patterns (e.g., a number of motion patterns and functions corresponding to the respective patterns) on one side thereof. When the mobile device 100 is set to display a preview screen in a finger mode, the display panel 131 may translucently display it on one side thereon. Alternatively, the display panel 131 may translucently display a screen requested for display on the preview screen. Meanwhile, when a second event occurs during a first event, the display panel 131 may translucently display the second screen corresponding to the second event on the first screen corresponding to the first event. The display panel 131 may be implemented with one of a Liquid Crystal Display (LCD), an Organic Light Emitting Diode (OLED), an Active Matrix Organic Light Emitting Diodes (AMOLED), and such.

The touch panel 132 performs an input function. The touch panel 132 is attached onto the display panel 131. The touch panel 132 senses a touch by detecting the change in a physical quantity, converts the change according to a touch into a touch signal, and transfers it to the controller 110. The touch panel 132 may be implemented with various types of touch sensors, for example, a pressure sensor, a resistive overlay type sensor, a capacitive overlay type sensor, an ultrasonic reflective sensor, an optical sensor, an electronic inductive sensor, and such. Since the operation of the touch panel 132 is well-known to the ordinary person skilled in the art, its detailed description is omitted.

The storage unit 120 stores programs for controlling the entire operation and function in the mobile device 100. The storage unit 120 also stores data created when the programs are executed and user input data. For example, the storage unit 120 stores an operating system (OS) for booting the mobile device 100 and application programs for operating the functions of the mobile device 100. Examples of the application programs are an audio playback program, a video reproducing program, a web access program, and such. In an embodiment of the invention, the storage unit 120 stores a database where motion patterns are stored and mapped to corresponding functions. For example, a motion pattern in which the finger moves from the left to the right corresponds to a termination function; a motion pattern where the finger moves from the right to the left corresponds to a cancel function; and a motion pattern where the finger moves from bottom to top corresponds to a screen capture function. It should be understood that the motion patterns are not limited to the invention. In addition, in an embodiment of the invention, the database may be implemented in such a way that the same motion pattern may be mapped to different functions according to the number of fingers, alternatively, according to the types of applications that are being executed. The database may be stored in the storage unit 120 when the mobile device 100 is manufactured. The database may be altered (registering new motion patterns, deleting, correcting, and such), via the menu, by a user. The storage unit 120 stores an application program that can detect the finger tip from videos acquired via the camera 170, track the movement of the finger tip, and determine whether the movement corresponds to a preset motion pattern. The storage unit 120 may further store an application program that can recognize letters by tracking the movement of the finger tip.

The controller 110 controls the entire operation of the mobile device 100 and the signals flowing between the components in the mobile device 100. The controller 110 also performs a data process function. In an embodiment of the invention, when a finger mode is activated in the mobile device 100, the controller 110 senses the finger via the camera 170, tracks the movement of the detected finger, and controls the mobile device 100 according to the tracked movement of the finger. To this end, the controller 110 includes a finger tracking unit 111.

The finger tracking unit 111 detects the finger tip from videos acquired via the camera 170, tracks the movement (or track) of the finger tip, and determines whether the tracked movement corresponds to a preset motion pattern stored in the storage unit 120. In an embodiment of the invention, motion patterns are allocated with corresponding functions.

When the controller 110 ascertains that the tracked movement corresponds to a preset motion pattern, it performs a function corresponding to the motion pattern. On the contrary, when the controller 110 ascertains that the tracked movement does not correspond to any preset motion patterns, it displays an error message, on the touch screen 130, via a pop-up message indicating that there is no motion pattern corresponding to the tracked movement or outputs a sound effect indicating that an error has occurred via the speaker (SPK). Alternatively, when an error occurs over a preset number of times (e.g., three times), the controller 110 may output, on the touch screen 130, information regarding available motion patterns (e.g., a number of motion patterns and functions corresponding to the respective motion patterns) via a pop-up window. This is to assist the user to input a correct input, referring to the information displayed on the pop-up window.

When the mobile device 100 operates in a finger mode, the controller 110 determines whether to show the videos acquired via the camera 170 on a preview screen. When the mobile device 100 is set to display a preview screen, the controller 110 translucently displays it on a portion of the touch screen 130. Translucently displaying the preview screen allows the user to view the original screen (e.g., an idle screen, a menu screen, a screen shown when a particular function is executed, and such). Alternatively, the controller 110 may translucently display the original screen on the preview screen.

The controller 110 can turn the camera 170 on/off according to turning on/off of the display panel 131. This is because the mobile device 100 is not controlled in a state where the display panel 131 is turned off.

In the foregoing description, an embodiment was described in which the camera 170 is always turned on in a finger mode. However, the embodiment may also be implemented in such a way that, although the mobile device 100 is executed in a finger mode, the controller 110 turns the camera 170 off on the idle screen and activates it when an event occurs. For example, when the controller 110 receives an Internet access request from the user while turning the camera 170 off on the idle screen, it can display the requested web page and simultaneously turn the camera 170 on.

When the controller 110 ascertains that a number of events occur, it can translucently display a second screen corresponding to a second event on a first screen corresponding to a first event. After that, the controller 110 controls the first screen according to touches created on the touch screen 130 and then the second screen according to the movement of the finger. For example, when the mobile device 100 receives a text message while reproducing a broadcast, the controller 110 may translucently display the text message screen (i.e., the second screen) on the broadcast screen (i.e., the first screen). During this process, when the controller 110 senses the finger moving from the left to the right, it can terminate the text message screen. Alternatively, when the controller 110 senses the finger drawing the letter 'R' in the air, it switches the text message screen to a reply message writing screen and then receives letters according to the movements of the finger. During this process, the controller 110 may also perform a variety of control operations regarding the currently reproduced broadcast, such as volume control, channel alternation, and such, according to the touches that occur on the touch panel 132.

In an embodiment, when the controller 110 ascertains that an alarm event occurs while reproducing a broadcast, it can translucently display the alarm screen on the broadcast reproducing screen. After that, when the controller 110 senses the finger moving as a preset motion pattern requested for alarm release, it can release the alarm. As such, the invention can simply release the alarm, without reproducing the broadcast and covering the screen.

Although it is not shown in FIG. 2, the mobile device 100 may selectively further include units that include add-on functions as follows: a short-range RF communication module; a broadcast module for receiving and reproducing broadcasts; an audio source playback module, such as an MP3 module; an Internet communication module for performing communication via the Internet; and such. With the spread of digital convergence, although mobile devices vary too greatly to list their modifications in this description, it will be easily appreciated by those skilled in the art that the other units equivalent to the above-listed units may be further included in the Bluetooth device of the invention.

Figure 3:
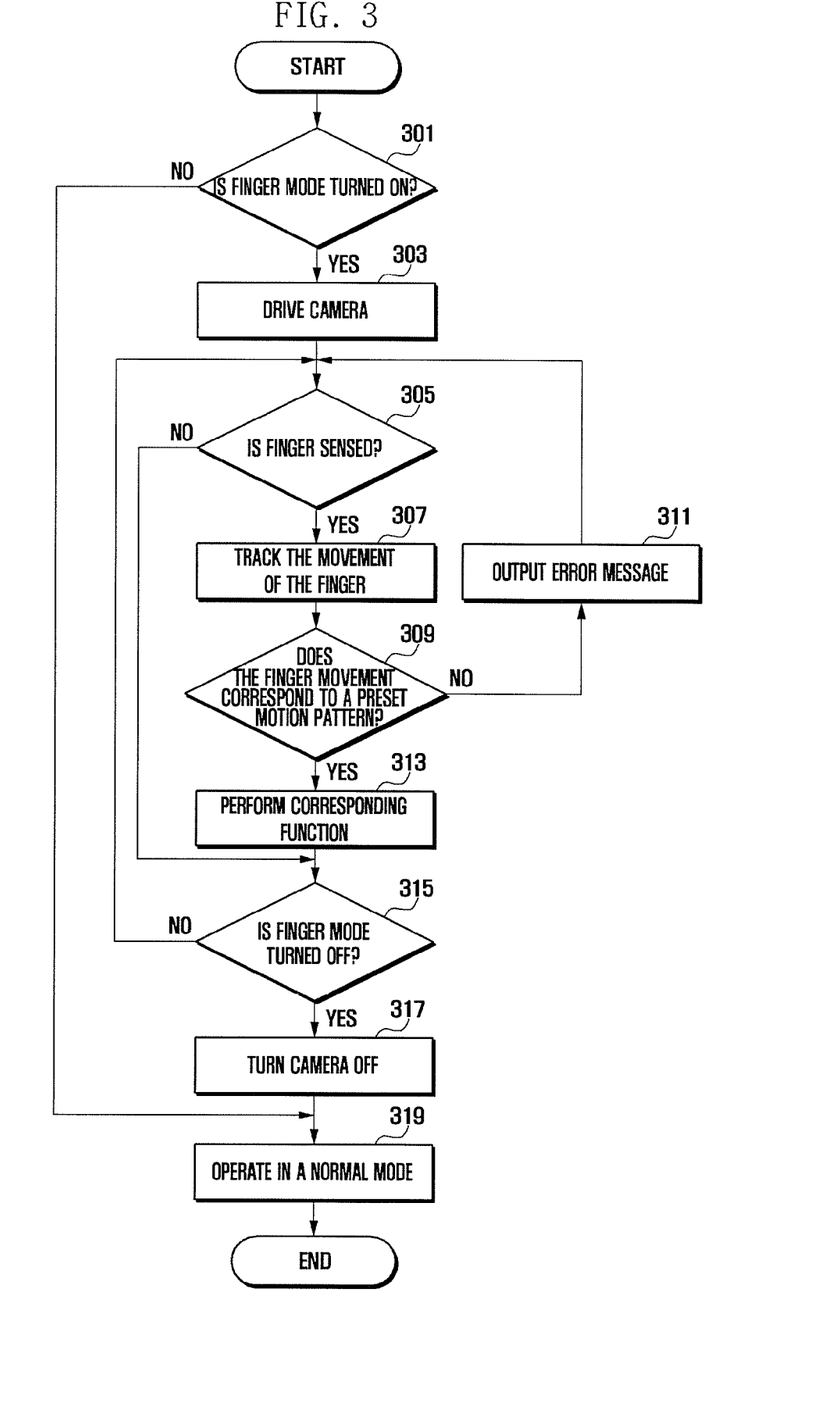
FIG. 3 illustrates a flow chart that describes a method for controlling a mobile device by tracking the movement of the finger, according to an embodiment of the invention.

FIG. 3 illustrates a flow chart that describes a process for controlling a mobile device by tracking the movement of the finger, according to an embodiment of the invention.

Referring to FIGS. 1 to 3, the controller 110 determines whether a finger mode is activated (block 301). In the finger mode, the controller 110 tracks the movement of the finger from the video acquired via the camera 170 and controls the mobile device 100.

When the controller 110 ascertains that a finger mode is not activated at block 301, it controls the mobile device 100 to operate in a normal mode (block 319). The controller 110 controls the mobile device 100 according to the signals transferred from the touch screen 130 and the input unit 140.

In contrast, when the controller 110 ascertains that a finger mode is activated at block 301, it drives the camera 170 (block 303). The controller 110 turns the camera 170 on/off according to turning the display panel 131 on/off. This is because the mobile device 100 is not controlled in a state where the display panel 131 is turned off. Meanwhile, although the mobile device 100 is executed in a finger mode, the controller 110 may turn the camera 170 off on the idle screen and activate it only if an event occurs. For example, when the controller 110 receives an Internet access request from the user while turning the camera 170 off on the idle screen, it can display the requested web page and simultaneously turn the camera 170 on.

After that, the controller 110 determines whether to sense the finger via the camera 170 (block 305). When the controller 110 senses the finger at block 305, it tracks the movement of the detected finger (block 307), and then determines whether the finger movement corresponds to preset motion patterns stored in the storage unit 120 (block 309). When the controller 110 ascertains that the finger movement does not correspond to any preset motion patterns at block 309, it outputs an error message (block 311). For example, the controller 110 may display, on the touch screen 130, a pop-up message indicating that there is no motion pattern corresponding to the tracked movement or may output a sound effect indicating that an error occurs via the speaker (SPK). In an embodiment, when an error occurs over a preset number of times (e.g., three times), the controller 110 may output, on the touch screen 130, information regarding available motion patterns (e.g., a number of motion patterns and functions corresponding to the respective motion patterns) via a pop-up window. This is to assist the user to input a correct motion on the mobile device 100, referring to the information displayed on the pop-up window. After outputting the error message, the controller 110 returns to and proceeds with block 305.

In contrast, when the controller 110 ascertains that the finger movement corresponds to a preset motion pattern at block 309, it performs a function corresponding to the motion pattern (block 313). For example, when the sensed movement of the finger corresponds to a function of scrolling the screen, the controller 110 scrolls the screen, e.g., a web page.

In block 315, the controller 110 determines whether the finger mode is turned off. When the controller 110 ascertains that the finger mode is still turned on at block 315, it returns to block 305. In contrast, when the controller 110 ascertains that the finger mode is turned off at block 315, it turns the camera 170 off (block 317) and then controls the mobile device 100 to operate in a normal mode (block 319). Meanwhile, when the controller 110 does not sense the finger at block 305, it proceeds with block 315.

Although it is not shown in FIG. 3, the embodiment may be modified in such a way to further include a process in which the controller 110 determines whether to display a preview screen of the camera 170 in the finger mode. In that situation, it is preferable that the preview screen may be translucently displayed on a portion of the touch screen 130. Translucently displaying the preview screen allows the user to view the original screen (e.g., an idle screen, a menu screen, a screen shown when a particular function is executed, and such). Alternatively, the controller 110 may translucently display the original screen on the preview screen.

As described above, since the mobile device 100 tracks the movement of the user's finger and is controlled thereby, it can provide the screen that shows the currently controlled states without the user's hand blocking the view of the screen. Therefore, this input system and method enhances the mobile device user's convenience and is useful when reading web pages or documents while scrolling them.

Figure 4:
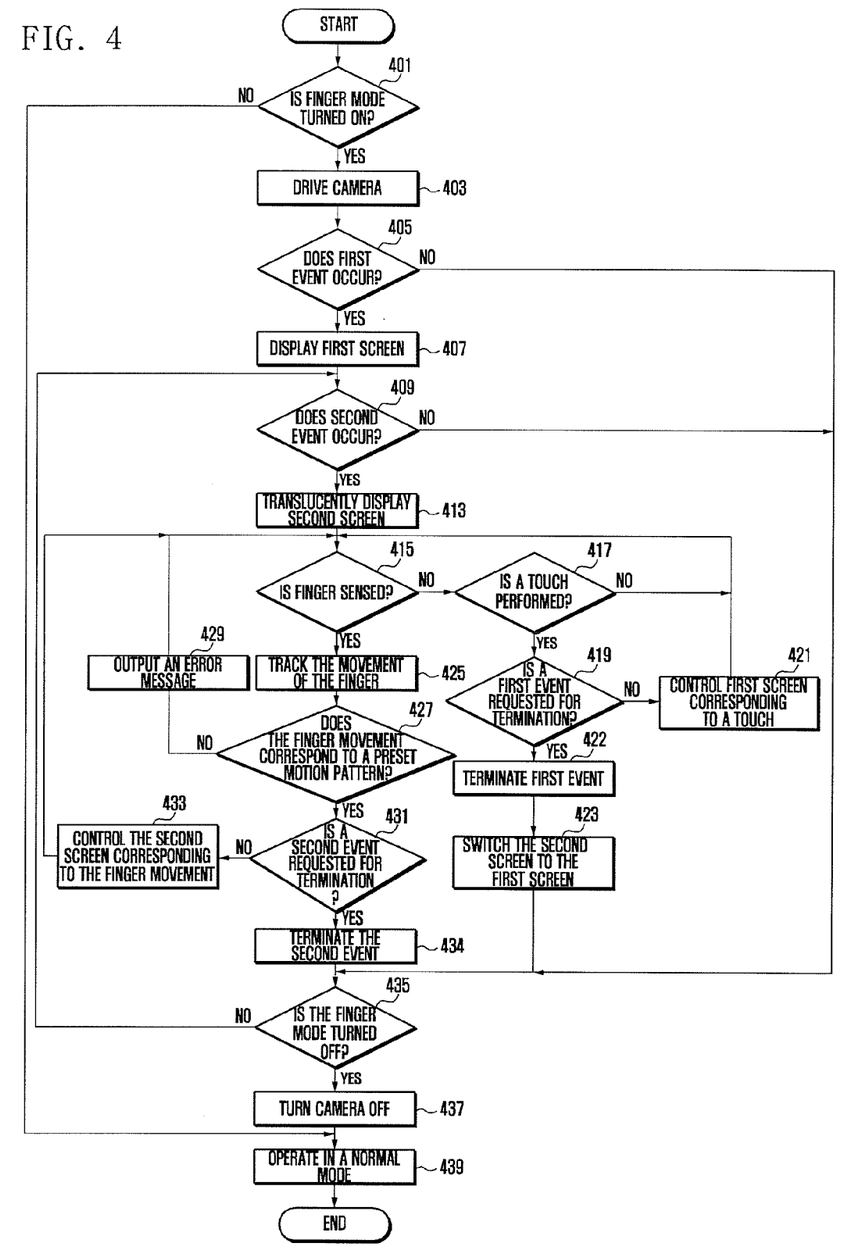
FIG. 4 illustrates a flow chart that describes a method for controlling a mobile device that executes a number of application programs, i.e., in a multitasking environment, by tracking the movement of the finger, according to an embodiment of the invention.

FIG. 4 illustrates a flow chart that describes a process for controlling a mobile device that executes a number of application programs, i.e., in a multitasking environment, by tracking the movement of the finger, according to an embodiment of the invention.

Referring to FIGS. 1 to 4, the controller 110 determines whether a finger mode is activated (block 401). In the finger mode, the controller 110 tracks the movement of the finger from the video acquired via the camera 170 and controls the mobile device 100.

When the controller 110 ascertains that a finger mode is not activated at block 401, it controls the mobile device 100 to operate in a normal mode (block 439). The controller 110 controls the mobile device 100 according to the signals transferred from the touch screen 130 and the input unit 140.

In contrast, when the controller 110 ascertains that a finger mode is activated at block 401, it drives the camera 170 (block 403).

In block 405, the controller 110 determines whether a first event occurs.

When the controller 110 ascertains that a first event occurs at block 405, it displays the first screen corresponding to the first event (block 407). For example, when the controller 110 ascertains that a digital broadcast reproducing event (i.e., first event) occurs, it displays the broadcast screen (i.e., first screen) on the display panel 131. During this process, as described in the section referring to FIG. 3, the controller 110 can control the first screen according to the movement of the finger recognized via the camera 170.

After displaying the first screen at block 407, the controller 110 determines whether a second event occurs (block 409). When the controller 110 ascertains that a second event occurs at block 409, it translucently displays the second screen corresponding to the second event on the display panel 131 (block 413).

In block 415, the controller 110 determines whether to sense the finger via the camera 170. When the controller 110 ascertains that the finger is not detected via the camera 170 at block 415, it determines whether a touch is created on the touch panel 132 (block 417). When the controller 110 ascertains that a touch is not created on the touch panel 132 at block 417, it returns to block 415. In contrast, when the controller 110 ascertains that a touch is created on the touch panel 132 at block 417, it determines whether the touch corresponds to a touch requested for the termination of the first event (block 419). When the controller 110 ascertains that the touch does not correspond to a touch requested for the termination of the first event at block 419, it controls the first screen according to the touch (block 421) and then returns to block 415. In contrast, when the controller 110 ascertains that the touch corresponds to a touch requested for the termination of the first event at block 419, it terminates the first event (block 422). In block 423, the controller 110 alters the second screen to the first screen and then proceeds with block 435 that will be described later.

Meanwhile, when the controller 110 ascertains that the finger is detected via the camera 170 at block 415, it tracks the movement of the detected finger (block 425), and determines whether the finger movement corresponds to any motion patterns stored in the storage unit 120 (block 427). When the controller 110 ascertains that the finger movement does not correspond to any motion patterns at block 427, it outputs an error message (block 429). For example, the controller 110 may display on the touch screen 130 a pop-up message indicating that there is no motion pattern corresponding to the tracked movement or may output a sound effect indicating that an error occurs via the speaker (SPK). In an embodiment, when an error occurs over a preset number of times (e.g., three times), the controller 110 may output, on the touch screen 130, information regarding available motion patterns via a pop-up window. This is to assist the user to input a correct motion to the mobile device 100, referring to the information displayed on the pop-up window. After outputting the error message, the controller 110 returns to and proceeds with block 415.

In contrast, when the controller 110 ascertains that the finger movement corresponds to a motion pattern at block 427, it determines whether the finger movement corresponds to a request for the termination of the second event (block 431). When the controller 110 ascertains that the finger movement does not correspond to a request for the termination of the second event at block 431, it controls the second screen according to the finger movement (block 433), and then returns to block 415. In contrast, when the controller 110 ascertains that the finger movement corresponds to a request for the termination of the second event at block 431, it terminates the second event (block 434).

In block 435, the controller 110 determines whether the finger mode is turned off. When the controller 110 ascertains that the finger mode is still turned on at block 435, it returns to and proceeds with block 409. In contrast, when the controller 110 ascertains that the finger mode is turned off at block 435, it turns the camera 170 off (block 437) and then controls the mobile device 100 to operate in a normal mode (block 439).

Meanwhile, when the controller 110 ascertains that a first event does not occur at block 405 or that a second event does not occur at block 409, it proceeds with block 435.

As described above, the embodiment is described such that, when the finger movement is not detected, the controller 110 determines whether to sense a touch. However, it should be understood that the invention is not limited to the embodiment. For example, when the finger movement is detected and a touch is concurrently applied to the mobile device 100, the controller 110 may control the first screen according to the input touch and the second screen according to the finger movement, respectively.

As described above, the method and system according to the invention can control a mobile device by tracking the movement of the finger. The method and system can also control a number of application programs by tracking the movement of fingers, via one of a number of input means. Therefore, the method and system do not require a screen switching operation to control a number of application programs, thereby enhancing user convenience.

As described above, the mobile device controlling method and system according to the invention can be implemented with program commands that can be conducted via various types of computers and recorded in computer-readable recording media. The computer-readable recording media contain program commands, data files, data structures, and such, or a combination thereof. The program commands recorded in the recording media may be designed or configured to comply with the invention or may be software well-known to the ordinary person skilled in the art.

The computer-readable recoding media includes hardware systems for storing and conducting program commands. Examples of the hardware systems are magnetic media (such as a hard disk, floppy disk, a magnetic tape), optical media (such as CD-ROM and DVD), Magneto-Optical Media (such as floptical disk), ROM, RAM, flash memory, and such. The program commands include assembly language or machine code compiled by a compiler and a higher level language interpreted by an interpreter. The hardware systems may be implemented with at least one software module to comply with the invention.

The terms or words described in the description and the claims should not be limited by a general or lexical meaning, and instead should be analyzed as a meaning and a concept through which the inventor defines and describes the invention to conform to the idea of the invention. Therefore, one skilled in the art will understand that the embodiments disclosed in the description and configurations illustrated in the drawings are only embodiments, instead there may be various modifications, alterations, and equivalents thereof to replace the embodiments at the time of filing this application.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to control a mobile device, the method comprising:
   determining whether a finger mode in which the mobile device is controlled by tracking a movement of a finger is activated;
   detecting, when the finger mode is activated, the finger using a camera and tracking the movement of the detected finger via the camera;

performing, when the tracked movement of the detected finger corresponds to a mapped motion pattern, a function corresponding to the mapped motion pattern;

displaying, after a first event occurs and a second event occurs while maintaining the occurrence of the first event, a first screen corresponding to the first event and translucently displaying a second screen corresponding to the second event on the first screen; and controlling the first screen according to an input touch and the second screen according to the movement of the finger sensed via the camera.

2. The method of claim 1, further comprising:
mapping motion patterns to functions, and storing the mappings between the motion patterns and the functions.

3. The method of claim 2, further comprising:
mapping one motion pattern to different functions, according to the number of fingers detected; and
mapping the one motion pattern to different functions, according to the types of application programs.

4. The method of claim 1, further comprising:
turning the camera off or on according to when the display panel is in the off or on state.

5. The method of claim 1, further comprising:
outputting an error message when the tracked movement of the finger does not correspond to a mapped motion pattern.

6. A method to control a mobile device, the method comprising:
determining whether a finger mode in which the mobile device is controlled by tracking a movement of a finger is activated;
detecting, when the finger mode is activated, the finger using a camera and tracking the movement of the detected finger via the camera;
performing, when the tracked movement of the detected finger corresponds to a mapped motion pattern, a function corresponding to the mapped motion pattern; and
outputting an error message when the tracked movement of the finger does not correspond to a mapped motion pattern,
wherein outputting an error message comprises outputting stored pattern infamiation on a portion of the display panel when the number of errors that occurred is equal to or greater than a threshold number of times.

7. The method of claim 1, wherein activating the finger mode comprises:
setting whether to display a preview screen.

8. The method of claim 1, further comprising:
terminating the first event in response to a request for termination of the first event; and
displaying the second screen as the first screen.

9. The method of claim 8, further comprising:
terminating the second event in response to a request for termination of the second event;
determining whether the finger mode is turned off; and
turning the camera off in response to determining that the finger mode is turned off.

10. A system to control a mobile device, the system comprising:
a camera configured to acquire videos in a finger mode in which the mobile device is controlled by tracking a movement of a finger; and
a controller configured to:
determine whether the finger mode is activated,
detect, when the finger mode is activated, the finger via the videos acquired by the camera,
track the movement of the detected finger, and
perform, when the tracked movement of the detected finger corresponds to a mapped motion pattern, a function corresponding to the mapped motion pattern,
wherein the controller is further configured to display, when a first event occurs and a second event occurs while maintaining the occurrence of the first event, a first screen corresponding to the first event and translucently a second screen corresponding to the second event on the first screen, and control the first screen according to an input touch and the second screen according to the movement of the finger sensed via the camera.

11. The system of claim 10, further comprising:
a storage unit configured to store a database configured to map and store motion patterns to functions.

12. The system of claim 11, wherein the database is configured such that one motion pattern maps to different functions according to at least one of the number of fingers and the type of application programs.

13. The system of claim 11, wherein the database is configured to be edited such that at least one of the motion patterns and the corresponding functions are one of corrected, deleted, and newly registered.

14. The system of claim 10, wherein the controller is further configured to turn the camera off or on according to when a display panel of the mobile device is turned off or on.

15. The system of claim 10, wherein the controller is further configured to output an error message when the tracked movement of the finger does not correspond to a mapped motion pattern.

16. The system of claim 15, wherein the controller is further configured to output stored pattern information on a portion of the display panel when the number of errors that occurred is equal to or greater than a threshold number of times.

17. The system of claim 10, wherein, when a preview screen is set to be displayed in the finger mode, the controller is further configured to control a display panel to display the preview screen on a portion of the display panel.

18. The system of claim 10, wherein the controller is further configured to terminate the second event in response to a request for termination of the second event, determine whether the finger mode is turned off, and turn the camera off in response to determining that the finger mode is turned off.

* * * * *